United States Patent
Manning

[11] Patent Number: 6,022,456
[45] Date of Patent: Feb. 8, 2000

[54] APPARATUS AND METHOD FOR GENERATING OZONE

[75] Inventor: Thomas J. Manning, Valdosta, Ga.

[73] Assignee: Valdosta State University, Valdosta, Ga.

[21] Appl. No.: 09/026,835

[22] Filed: Feb. 20, 1998

Related U.S. Application Data

[60] Provisional application No. 60/038,881, Feb. 20, 1997.

[51] Int. Cl.$^7$ ..................................................... B01J 19/08
[52] U.S. Cl. ...................................... 204/176; 422/186.07
[58] Field of Search ........................ 204/176; 422/186.07

[56] References Cited

U.S. PATENT DOCUMENTS

| | | | |
|---|---|---|---|
| 3,256,164 | 6/1966 | Donohue et al. | 204/129 |
| 3,309,300 | 3/1967 | Grosse et al. | 204/176 |
| 3,654,126 | 4/1972 | McNabney et al. | 204/314 |
| 3,702,973 | 11/1972 | Daugherty et al. | 331/94.5 PE |
| 3,921,002 | 11/1975 | Williams et al. | 250/533 |
| 3,963,625 | 6/1976 | Lowther | 204/176 |
| 4,131,528 | 12/1978 | Tsujimoto et al. | 204/157.1 R |
| 4,135,995 | 1/1979 | Welch | 204/98 |
| 4,316,782 | 2/1982 | Foller et al. | 204/129 |
| 4,375,395 | 3/1983 | Foller et al. | 204/129 |
| 4,417,966 | 11/1983 | Krauss et al. | 204/176 |
| 4,462,965 | 7/1984 | Azuma et al. | 4/4 |
| 4,863,701 | 9/1989 | McMurray | 422/186.08 |
| 5,047,127 | 9/1991 | Tottori et al. | 204/176 |
| 5,098,671 | 3/1992 | Shiota | 422/186.07 |
| 5,124,132 | 6/1992 | Francis, Jr. et al. | 422/186.07 |
| 5,223,105 | 6/1993 | Arthurson | 204/176 |
| 5,332,563 | 7/1994 | Chang | 423/245.1 |
| 5,366,703 | 11/1994 | Liechti et al. | 422/186.11 |
| 5,370,846 | 12/1994 | Yokomi et al. | 422/186.07 |
| 5,387,400 | 2/1995 | Pelster | 422/186.03 |
| 5,407,550 | 4/1995 | Shimamune et al. | 204/283 |
| 5,460,705 | 10/1995 | Murphy et al. | 204/252 |
| 5,520,887 | 5/1996 | Shimizu et al. | 422/186.08 |
| 5,559,740 | 9/1996 | Jang et al. | 437/190 |
| 5,611,868 | 3/1997 | Gursten et al. | 134/21 |
| 5,614,151 | 3/1997 | LeVay et al. | 422/24 |
| 5,637,231 | 6/1997 | Hill et al. | 217/748 |
| 5,658,429 | 8/1997 | Anderson et al. | 165/65 |
| 5,810,978 | 9/1998 | Nakatsuka et al. | 4/4 |

*Primary Examiner*—Kishor Mayekar
*Attorney, Agent, or Firm*—Jones & Askew, LLP

[57] ABSTRACT

A recirculating loop method for producing and/or using ozone is disclosed. The method comprises the steps of: supplying a gas mixture comprising oxygen and a catalyst, generating ozone from the gas mixture, and recirculating the gas mixture. In a preferred method, the method comprises the additional steps of: reacting the ozone with a chemically reactive species and adding sufficient oxygen to the oxygen and noble gas mixture to maintain the specific oxygen to noble gas ratio. Preferably, the ozone is generated by electrical discharge from oxygen and noble gas mixtures of a volume ratio of not greater than 9 to 1 oxygen to catalyst gas. The closed loop apparatus for generating ozone gas comprises: an electrical discharge chamber, a means for supplying oxygen to said electrical discharge chamber, a means for supplying a catalyst to said electrical discharge chamber, an application chamber connected to said electrical chamber, a means for supplying a chemically reactive species to said application chamber, a means for removing said chemically reactive species from said application chamber, a means for returning oxygen and the catalyst to said electrical discharge chamber.

19 Claims, 9 Drawing Sheets

APPARATUS AND METHOD FOR GENERATING OZONE

CROSS-REFERENCES TO RELATED APPLICATIONS

This application claims priority to provisional application Ser. No. 60/038,881 filed Feb. 20, 1997.

FIELD OF THE INVENTION

This invention is related to an apparatus and method for generating ozone. In particular, the present invention concerns the economic production of ozone using a recirculating apparatus and method. In one embodiment, the ozone is generated from a gas mixture comprising oxygen and an inert catalyst gas.

BACKGROUND OF THE INVENTION

Ozone currently has many widespread industrial applications including: the destruction organic and inorganic contaminants in wastewater and sludge (U.S. Pat. No. 5,637,231); disinfection (U.S. Pat. No. 5,614,151); environmentally friendly bleaching of paper (U.S. Pat. No. 5,658,429); etching surfaces of semiconductors (U.S. Pat. No. 5,599,740); decolorizing water; removing odor from clothing (U.S. Pat. No. 5,611,868); and killing insects, etc. Like chlorine gas, fluorine gas, chlorine oxide compounds and hydrogen peroxide, ozone is a strong oxidizing agent. However, ozone is less environmentally hazardous than the aforementioned oxidizing agents, and has well-known environmental advantages over other strong oxidizing agents. For example, chlorine containing compounds leave behind an undesirable chlorine residue, and fluorine gas is highly corrosive and requires special handling.

Ozone, $O_3$, is made from stable molecular oxygen, $O_2$. However, ozone is unstable at ambient temperatures and decomposes rapidly. Because ozone decomposes at ambient temperature, it must be manufactured on-site for industrial applications. Current technology in ozone production is carried out by one of two general techniques. One general technique utilizes electrochemical techniques to generate ozone atoms. See, for example, U.S. Pat. Nos. 3,256,164; 4,135,995; 4,316,782; 4,375,395; 5,332,563; 5,407,550 and 5,460,705. Electrochemical techniques require electrochemical cells composed of an anode and a cathode conducting electricity through a solution or a solid. The electrochemical cells produce toxic by-products that can be difficult to dispose. The systems utilizing electrochemical techniques also suffer from high electrical consumption.

For example, U.S. Pat. No. 5,407,550 requires an electrochemical cell to produce ozone. The electrochemical cell uses an anode and a cathode to conduct electricity through a solution or a solid. The system described in U.S. Pat. No. 5,407,550 also requires a perfluorocarbon sulfonic acid-based ion-exchange membrane as the electrolyte.

The second general technique utilizes electrical discharge to generate ozone atoms. See, for example, U.S. Pat. Nos. 4,131,528; 3,309,300; 3,654,126; 5,366,703; 5,223,105; 3,921,002; 4,417,966; 5,098,671; 5,124,132; 5,370,846 and 4,863,701. The above-referenced systems utilizing electrical discharge also suffer from high electrical consumptions and a low conversion efficiencies from oxygen to ozone.

U.S. Pat. No. 4,863,701 describes a system which passes an electrical discharge through an oxygen gas and converts oxygen to ozone. U.S. Pat. No. 4,863,701 does not incorporate inert gases to boost efficiency and does not utilize a loop to recycle the oxygen not converted to ozone.

U.S. Pat. No. 5,370,846 uses argon and helium gases and a specific type of silent discharge to produce ozone. However, U.S. Pat. No. 5,370,846 only uses gas mixtures for argon and helium in the 1–10 percent range. There is no loop for the recycling of the inert gas-oxygen mixture. No catalytic advantage was demonstrated for the inert gases. The efficiency demonstrated for inert gas argon-helium-oxygen mixtures in the generator are less than for a nitrogen-oxygen mix.

There are other specific methods of producing ozone using high energy methods, for example UV light, beta rays or lasers, to convert oxygen to ozone, but these methods have not found significant commercial application. U.S. Pat. Nos. 3,702,973 and 5,387,400 are examples of such highly specific methods. Current applications of ozone are limited by the cost of instrumentation required for ozone production, the high consumption of electricity during ozone production and the low efficiencies of current methods of converting oxygen to ozone.

SUMMARY OF THE INVENTION

The present invention provides apparatuses and methods of generating and/or using ozone that use a self-contained recirculating loop and allow the economical and efficient use of catalysts. The present invention allows the selection of oxygen and catalyst gas mixtures to control the plasma temperature, the electron density, the average ionization potential and other fundamental parameters important in ozone production using electrical discharge systems. The catalyst gases lower the power consumption of the discharge. The invention contemplates the combined use of more than one catalyst gas in the practice of the invention.

In one embodiment, the invention comprises an apparatus for generating ozone comprising a recirculating system which comprises an oxygen and catalyst supply connected to a generation means, which is in turn connected to a separation or application means, wherein the generated ozone is separated or used. The remaining oxygen and catalyst are returned to the generation means. Preferably, the oxygen to catalyst ratio of the mixture entering the generation means is not greater than 9 to 1.

The method for generating ozone comprises the steps of: supplying a gas mixture comprising oxygen and a catalyst, generating ozone from the gas mixture, and recirculating the gas mixture. In a preferred embodiment, the method for generating ozone comprises the steps of: (i) utilizing an inductively coupled plasma, a direct current plasma or corona discharge system on an oxygen and inert gas mixture to generate ozone, (ii) forwarding the ozone and the gas mixture to a separation chamber where the generated ozone is liquefied and separated by maintaining the temperature of the separation chamber such that oxygen and the inert gas remain in the gas phase, and (iii) returning the remaining gases back to step (i). The Liquid ozone may be continually removed during step (ii) to an expansion chamber where it can be gasified and forwarded to an application chamber for use.

In a more preferred embodiment, the method for generating ozone comprises the steps of: (i) utilizing an inductively coupled plasma, a direct current plasma or corona discharge system on an oxygen mixture and inert gas to generate ozone, (ii) forwarding the ozone and the gas mixture to an application chamber where the generated ozone is used, preferably by bubbling the generated ozone through a liquid, and (iii) returning the remaining gases in contained in the gas mixture back to step (i). The gases remaining in the gas mixture, oxygen and the catalyst gas, are returned to the generation means of step (i).

In a preferred embodiment, the ozone is generated from the oxygen and an inert gas mixture using corona discharge, direct current, or inductively coupled plasma in the recirculating loop. The ozone can be liquefied from the oxygen and noble gas mixture by boiling point separation. The remaining gases can be returned to the plasma or corona discharge thereby minimizing the consumption of the noble gas and maximizing the efficiency of converting oxygen to ozone.

A primary object of the invention is to develop a method of using noble gases as catalysts in conjunction with oxygen to increase the efficiency of ozone production in various systems. Noble gases are defined as gases of Group VIIIa of the Periodic Table of Elements and include helium, neon, argon, krypton, xenon and radon.

A further object of the invention is to develop a method and apparatus to economically use and recover inert gas catalysts in the production of ozone.

The foregoing has outlined some of the more pertinent objects of the invention. These objects should be construed to be merely illustrative of some of the more prominent features and applications of the intended invention. Many other beneficial results and advantages can be obtained by applying the disclosed invention in a different manner or modifying the invention within the scope of the disclosure. Accordingly, a fuller understanding of the invention may be had by referring to the detailed description in addition to the scope of the invention defined by the claims taken in conjunction with the accompanying figures.

DETAILED DESCRIPTION

Figure 1:
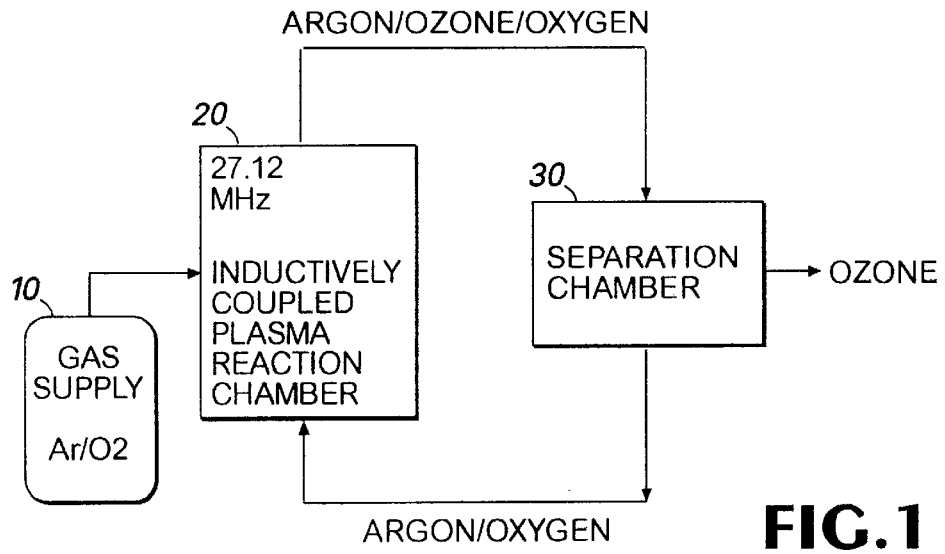
FIG. 1 is a schematic illustration of an apparatus and a method for generating ozone of the present invention.

The invention relates to an apparatus and a method for generating ozone, an embodiment of which is schematically illustrated in FIG. 1. The apparatus comprises an oxygen and catalyst supply means 10 connected to an ozone generation means 20 connected either to an ozone separation means 30 or, alternatively, an ozone application means, which is in turn connected back to the generation means 10 forming a loop. The formation of a loop allows the unreacted oxygen and catalyst gases to be recirculated and reused improving the efficiency and decreasing the cost of ozone production. The method comprises the steps of: i) supplying a gas mixture comprising oxygen and a catalyst; ii) generating ozone from the gas mixture; iii) separating the ozone from the gas mixture or, alternatively, reacting the ozone contained in the gas mixture; and iv) recirculating the gas mixture.

The generation of ozone from the oxygen and catalyst gas mixture can be achieved by an inductively coupled plasma, a corona discharge, a direct current plasma, or any known means to generate oxygen atoms that recombine with cool oxygen molecules to form ozone molecules. Plasma is a discharge characterized by relatively high temperatures, electron densities, and ion densities. Although the above methods use different electrical and mechanical methods to generate the plasma, they all produce an oxygen and catalyst gas plasma that produces ozone. Inductively coupled plasma uses a radio frequency or microwave frequency plasma that operates at atmospheric pressure or sub-atmospheric pressure. An inductively coupled plasma process utilizes an induction coil to generate a magnetic field that maintains the plasma. Corona discharge uses two plates that are oppositely charged to generate a plasma. Direct current plasma uses two electrodes that are oppositely charged to generate plasma.

Figure 2:
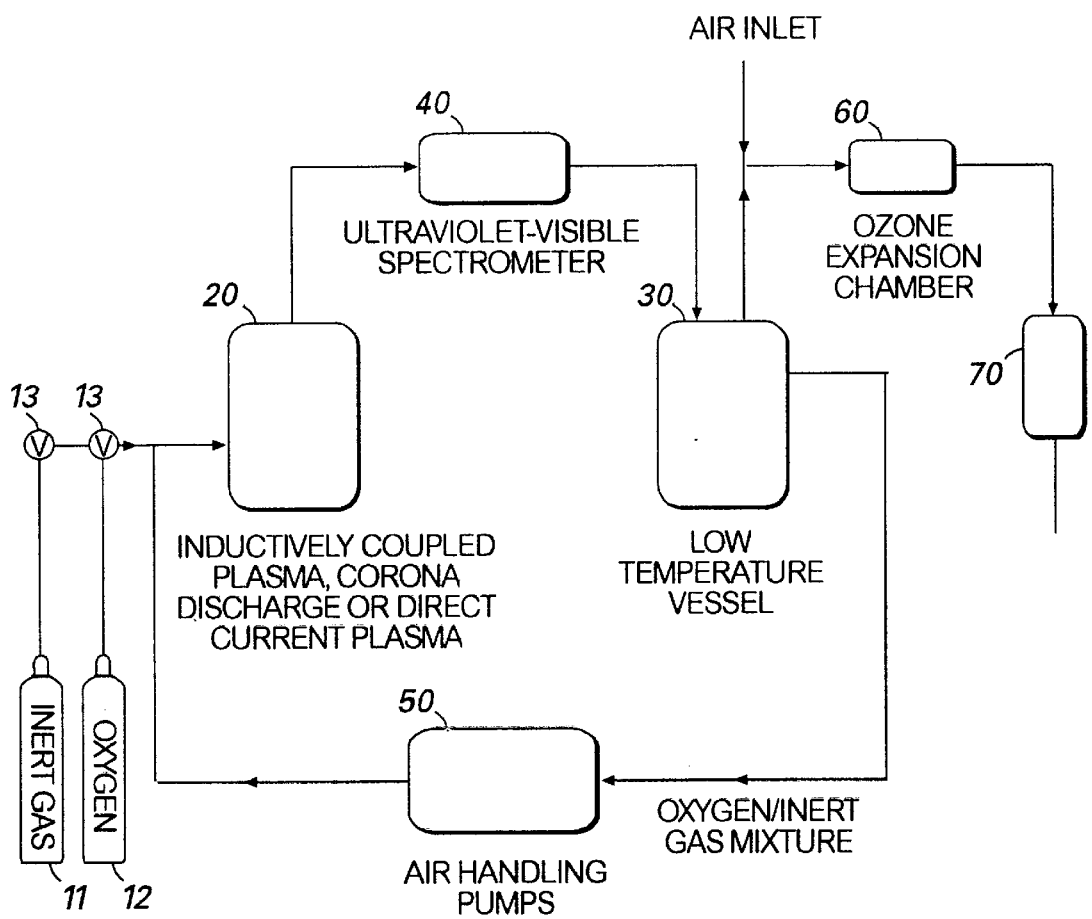
FIG. 2 is a schematic illustration of a preferred apparatus and a preferred method for generating ozone.

A preferred and more detailed embodiment of the apparatus and method in accordance with the invention is schematically illustrated in FIG. 2. In the embodiment illustrated in FIG. 2, the apparatus comprises an oxygen supply means 11 and a catalyst supply means 12. The oxygen gas supply means 11 and the catalyst supply means 12 are connected to an ozone generation means 20. The ozone generation means 20 can be any of various known means of generating ozone molecules from an oxygen containing gas mixture preferably including an inert catalyst gas. The ozone generation means 20 is connected to either an ozone separation means 30 or, alternatively, an ozone application means. A preferred means of separating ozone includes a low temperature vessel for reducing the temperature of the gas mixture exiting the generation means 20 to a temperature below the boiling point of ozone, about −112° C. at atmospheric pressure, yet above the boiling temperatures of oxygen, about −183° C. at atmospheric pressure, and the catalyst gas or gases contained in the gas mixture. Other separation means may be used in the invention. The ozone separation means 30 or alternative ozone application means connects back to the generation means 10 forming a loop.

The gas mixture after exiting the generation means 20 contains ozone, oxygen and catalyst gas(es). Gases that can be used as a catalyst in the generation of ozone include, but are not limited to, inert gases such as nitrogen and any of the noble gases of Group VIIIa of the Periodic Table of Elements. Noble gases include helium, neon, argon, krypton, xenon and radon. It should be noted that when using a low temperature method as the separation means 30, the catalysts gases krypton, xenon and radon are not preferred because these catalyst gases have higher boiling points that do not allow them to be separated from oxygen. The catalysts serve the purpose of lowering the power consumption of the plasma while producing equal quantities of ozone and increasing the efficiency of oxygen to ozone conversion. The catalyst accomplishes this by effecting the temperature and electron density of the plasma as well as serving a medium for elastic and inelastic collisions with the various forms of oxygen. Preferred catalysts include helium, neon, argon and mixtures thereof. More preferred catalyst include argon and mixtures thereof. Ozone has a lower boiling point than oxygen and the preferred catalyst gases, making it is possible to easily separate ozone from these gases using temperature.

The separation means 30 isolates the ozone from the oxygen and other gases in the gas mixture. Because of the lower boiling point of ozone relative to the other gases, the ozone may be separated from the other gases by boiling point. The separation means is maintained at a low enough temperature (e.g. 95° K) to allow oxygen and the catalyst gas to remain in the gaseous phase, but liquefies the ozone. A refrigeration system may be used to liquefy the ozone without liquefying the accompanying oxygen and catalyst gases. The remaining gases, the oxygen and catalyst gas(es), can be recirculated and recycled.

Figure 3:
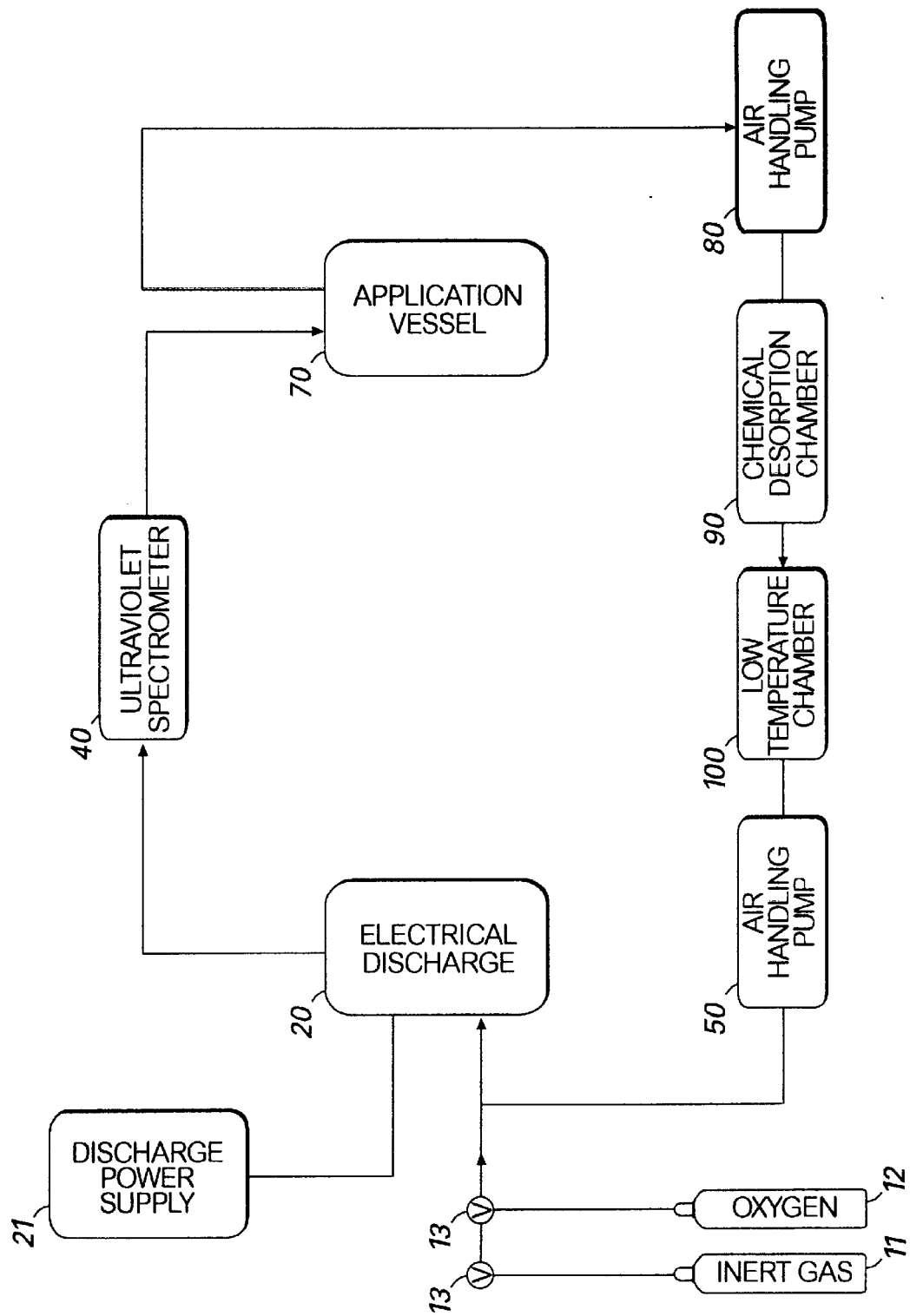
FIG. 3 is a schematic illustration of a more preferred apparatus and a more preferred method process for generating ozone.
Figure 4:
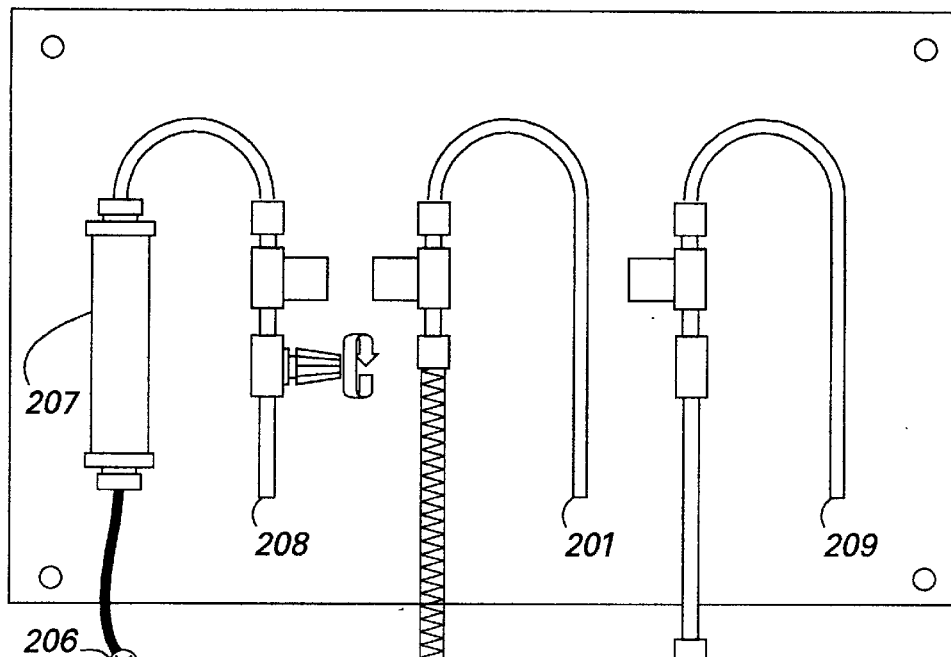
FIG. 4 is a detailed illustration of a preferred separation means.

A detailed illustration of a preferred separation means is provided in FIG. 4. The gas mixture after exiting the generation means 20 (FIG. 3) enters the separation means at port 201. The gas mixture travels to a vessel 202, which is cooled by a cooling means 203. There the ozone is liquefied and continuously pulled out of the vessel 202 though a conduit 204. Preferably, the conduit 204 and any of the metal parts and fittings are made from stainless steel to minimize corrosion. Stainless steel is preferred because stainless steel minimizes corrosion compared to other materials (e.g. PVC, Teflon, copper, etc.). The ozone is then mixed with air, whose flow may be controlled by a needle valve 206. The air may be at ambient temperature and the needle valve 206 allows for the precise control of the volume of air entering the line. The ozone and air mixture is then pulled through an expansion chamber 207 by a pump (not shown) that is controlled with another needle valve 208. The oxygen and catalyst gas leave the separation means through a second conduit 209 and are returned to the generation means by optional air handling pump(s).

Preferably, the liquid ozone is drawn out of the separation means 30 at the same rate that it is liquefied. This avoids the unnecessary build up of explosive liquid. A conduit is attached to a pump constantly drawing the liquid ozone out of the separation means and mixing the ozone with air, allowing the ozone to expand, and transports the ozone to an area where the ozone can be used or reacted with a chemically reactive species. The expansion chamber is a vessel that is held at ambient temperature, ensuring that the liquid ozone returns to the gas phase. The pump simply pulls the air from one conduit and pushes it into another conduit. Shipping a cool ozone gas minimizes the decomposition of the ozone to oxygen that takes place spontaneously at higher temperatures. The oxygen and catalyst gas(es) are then pumped back to the generation means 20 (FIG. 3) for reuse and recycling. By this method and apparatus, the catalysts do not have to leave the loop and the oxygen only leaves the loop as ozone. Because a small quantity of the catalyst gas is contained in the loop at any given time, its consumption is minimal and does not limit the economical efficiency of the process. Additionally, because the closed loop systems does not exhaust oxygen, unless it is converted to ozone, the efficiency of oxygen to ozone conversion is very high and unreacted oxygen can be recycled through the system numerous times.

The apparatus may optionally comprise additional components, a few of which are also illustrated in FIG. 2. An ultraviolet-visible spectrometer 40 such as a Perkin Elmer Lambda 11 spectrometer used in the Examples or other means of quantifying the ozone level in the gas mixture exiting the ozone generation means 20 may be included in the loop. An ultraviolet-visible spectrometer uses an ultraviolet light source that is focused and collimated through a quartz cell. The quartz cell, which has ports at either end, is in line with the oxygen, catalyst and ozone gas stream that is being transported from ozone generation means 20 to the separation or application means. Because ozone absorbs light in the ultraviolet with its maximum absorbance coming at 254 nanometers, the ultraviolet-visible spectrometer should be set at 254 nanometers to quantify the ozone level in the gas mixtures. Oxygen and the catalyst gases do not significantly absorb light at 254 nanometers. The absorbance of 254 nanometer light by the gas mixture is directly proportional to the concentration of the ozone in the gas mixture. Thus, the ultraviolet-visible light source allows for the continuous monitoring of the ozone concentration. In Example 1 below, the ultraviolet-visible spectrometer 40 was separated from the electrical discharge source by approximately 10 feet of quarter inch diameter tubing.

Additionally, the apparatus may comprise an expansion chamber 60 (FIG. 1) to expand the liquid ozone exiting the ozone separation means 30, if liquification is used as the means to separated the ozone from the gas mixture, so that the ozone exiting the separation means 30 can be gasified for further application or use in an application means 70. Another component which can be included in the apparatus of the preferred embodiment is an air handling pump 50 (FIG. 1) or other means of returning the remaining gases back to the generation means 20. The air handling pump 50 pulls gas in one port and pushes it out another, preferably without any air or oil contamination. The pump can be used to pressurize the recirculated oxygen and catalyst gas mixture to the same pressure as the oxygen and catalyst gas(es) leaving the gas supply means, 11 and 12 or 10, generally.

In the preferred embodiment illustrated in FIG. 2, the method comprises the steps of: i) supplying a gas mixture comprising oxygen and a catalyst gas, preferably an inert catalyst gas and more preferably a noble gas; ii) generating ozone from the gas mixture; iii) separating the ozone from the gas mixture; and iv) recirculating the gas mixture. The method may also comprise additional steps. For example, the method may include cooling the gas mixture after generating ozone in order to reduce the rate of decomposition of the ozone, forwarding the separated ozone and applying, reacting or otherwise using the ozone.

Alternatively, the method can comprise the steps of: i) supplying a gas mixture comprising oxygen and a catalyst gas, ii) generating ozone from the gas mixture, iii) reacting the ozone contained in the gas mixture, and iv) recirculating the gas mixture. An embodiment of an apparatus and method of such an embodiment is schematically illustrated in FIG. 3. In the embodiment illustrated in FIG. 3, the apparatus comprises an oxygen supply means 11 and a catalyst supply means 12. The oxygen gas supply means 11 and the catalyst supply means 12 are connected to an ozone generation means 20. The ozone generation means 20 is connected to an ozone application means 70. The ozone application means 70 connects back to the generation means 10 forming a loop.

The apparatus may optionally comprise additional components, a few of which are also illustrated in FIG. 3. A valve or valves 13 may be incorporated into the apparatus to control the rate of flow of the oxygen and catalyst gas(es) into the generation means 10 and the apparatus. The apparatus may comprise an air handling pump 80, a chemical desorption means 90, a low temperature chamber 100, or various other means capable of removing contaminants from the gas mixture. Preferably, the chemical desorption means 90 comprises a chamber composed of silica gel that removes any unwanted organic contaminants that may be contained in the gas mixture after leaving the application means 70. The low temperature chamber 100 can be used to remove any water vapor and other high boiling point contained in the gas mixture leaving the application means 70. After the various contaminants are removed, the gas stream may be monitored for catalyst gas to oxygen ratio by measuring means 50 and additional oxygen may be added to the gas stream to maintain a constant oxygen to catalyst gas ratio before returning to ozone generation means 20.

Figure 5:
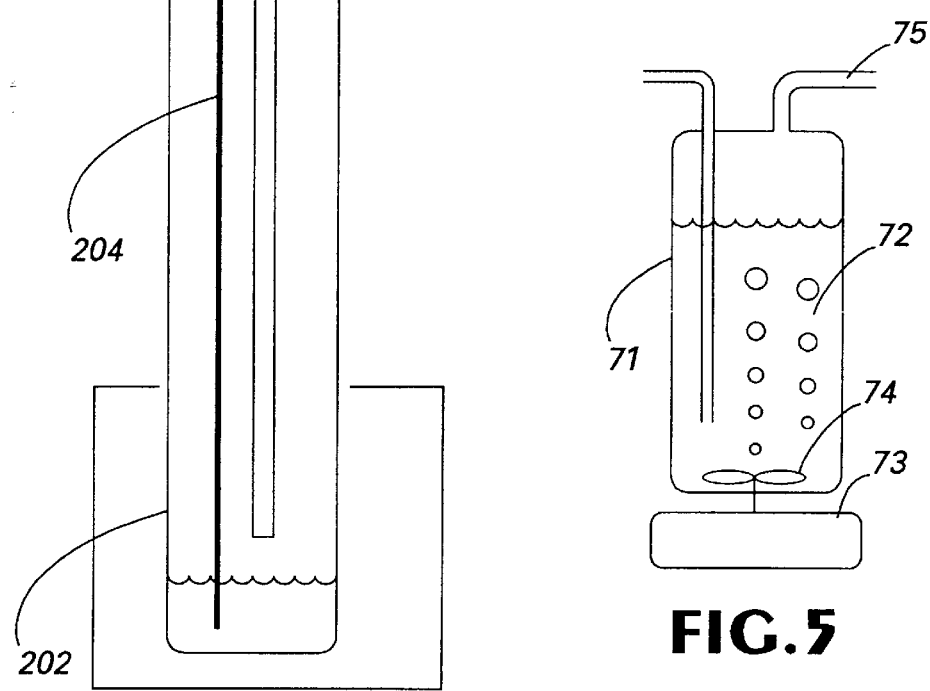
FIG. 5 is a detailed illustration of a preferred application means.

The oxygen, catalyst gas and ozone gas mixture is transported though an application means 70 where ozone's strong oxidizing properties may be utilized. In a preferred embodiment, the ozone is bubbled through a liquid where ozone dissolves into the liquid and the bulk of the remaining gases, oxygen and catalyst, exit as vapors. A preferred application means 70 is schematically illustrated in FIG. 5. The preferred application means comprises a vessel 71, a liquid 72 containing a chemically reactive species through which the ozone containing gas is bubbled. A fraction of the ozone dissolves or reacts with the liquid 72, slurry or any other atomic, ionic or molecular species contained within. A conduit 75 forwards the gas mixture to the remaining components in the apparatus. The apparatus may also comprise a stirring means comprising a stir bar 73 and stirrer 74 to insure a homogeneous mixture in the liquid 72.

The apparatus used to generate the compositions in Example 1 is that illustrated in FIG. 3 and comprised a discharge power supply 21 to supply power to the generation means 20. In the embodiment used to generate the compositions of the Examples, the discharge power supply drew 110 volts of alternating current. The generation means 20 was a twelve inch corona discharge tube having stainless steel electrodes separated by a gap of approximately 1 millimeter and had a voltage of 6700 volts of alternating current applied across it. The system was operated at 60 Hertz and the electrodes are sealed in a non conducting material. The generation means 20 used was s a corona discharge system and is commercially available from Oxy-Pure L.C. of East Alton, Ill.

Figure 6:
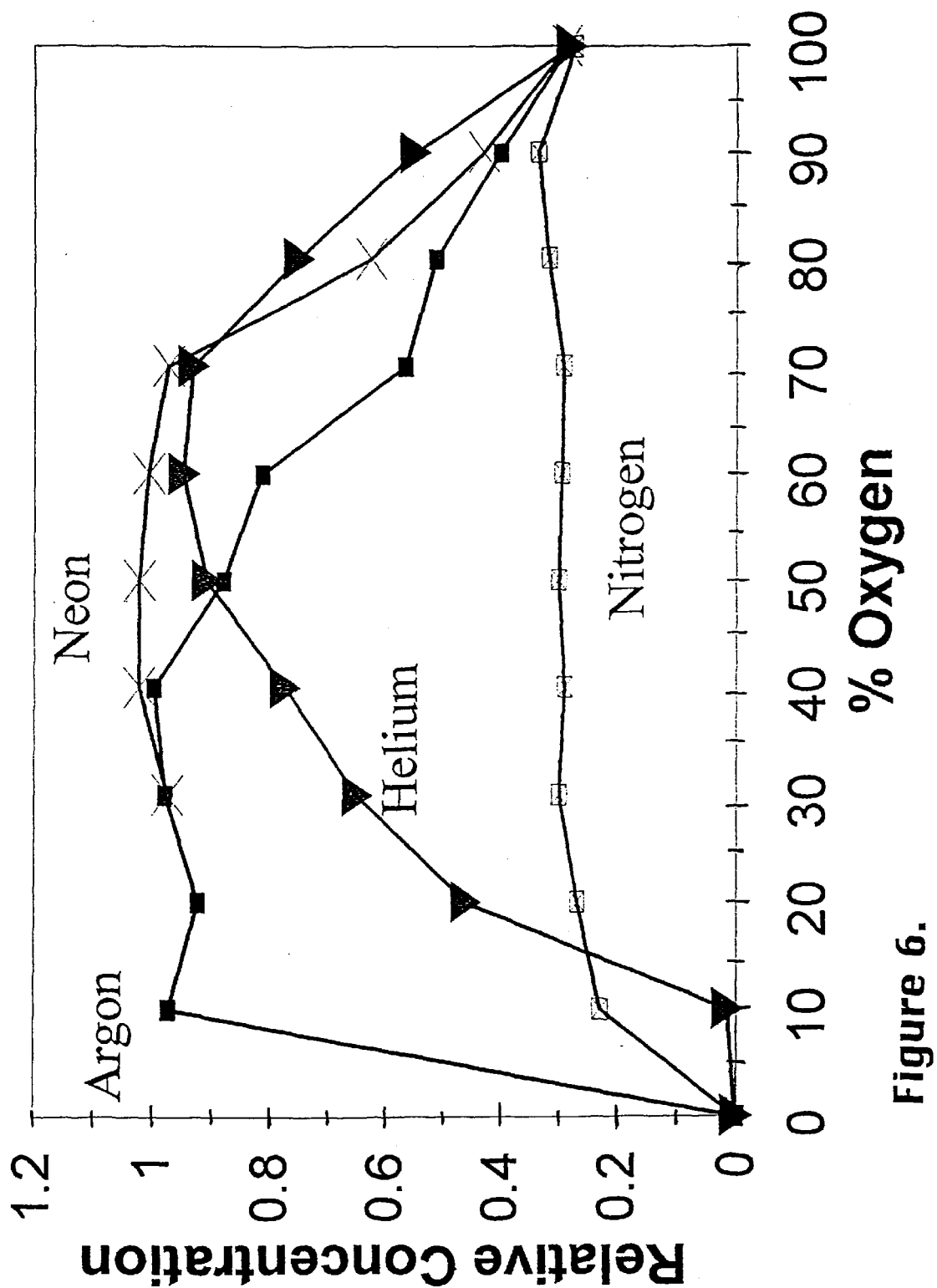
FIG. 6 is graph comparing the production of ozone from gas mixtures of oxygen and four catalyst gases, helium, argon, neon and nitrogen at varying concentrations.

The effects the catalyst gases helium, argon, neon and nitrogen on the efficiency of ozone production by corona discharge were tested and measured. Each of the four tested catalyst gas mixtures, helium/oxygen, argon/oxygen, neon/oxygen and nitrogen/oxygen, was tested for catalyst and oxygen mixtures at 10 volume percent concentration intervals ranging from 0 to 100 volume percent of catalyst gas. The respective gas stream flows and pressures were constant at 10 liters per minute and 25 psi. FIG. 6 presents the concentration of ozone for each of the respective oxygen and catalyst gas mixtures. The horizontal axis of FIG. 6 represents the fraction of oxygen contained in the oxygen and catalyst gas mixture introduced into the corona discharge. The vertical axis of FIG. 6 represents the relative ozone concentration of the gas mixture after exiting the corona discharge as measured by a spectrometer.

From the data presented in FIG. 6, it is observed that nitrogen affects the ozone production minimally compared to the noble catalyst gases argon, neon and helium. In addition to not increasing the efficiency as greatly, the addition of nitrogen gas generates various undesirable oxides of nitrogen, generalized by the formula $N_xO_y$, where x and y are greater than zero. In contrast, the addition of noble catalyst gases to oxygen cause significant gains in the efficiency of ozone production. FIG. 6 clearly shows that the addition of the noble catalyst gases argon, neon and helium significantly improve the efficiency of ozone production for oxygen gas mixtures. FIG. 6 also shows that for oxygen concentrations of less than 50 percent, argon is a preferred catalyst over helium and neon and for oxygen concentration greater than 50 percent helium is a preferred catalyst over argon.

Figure 7:
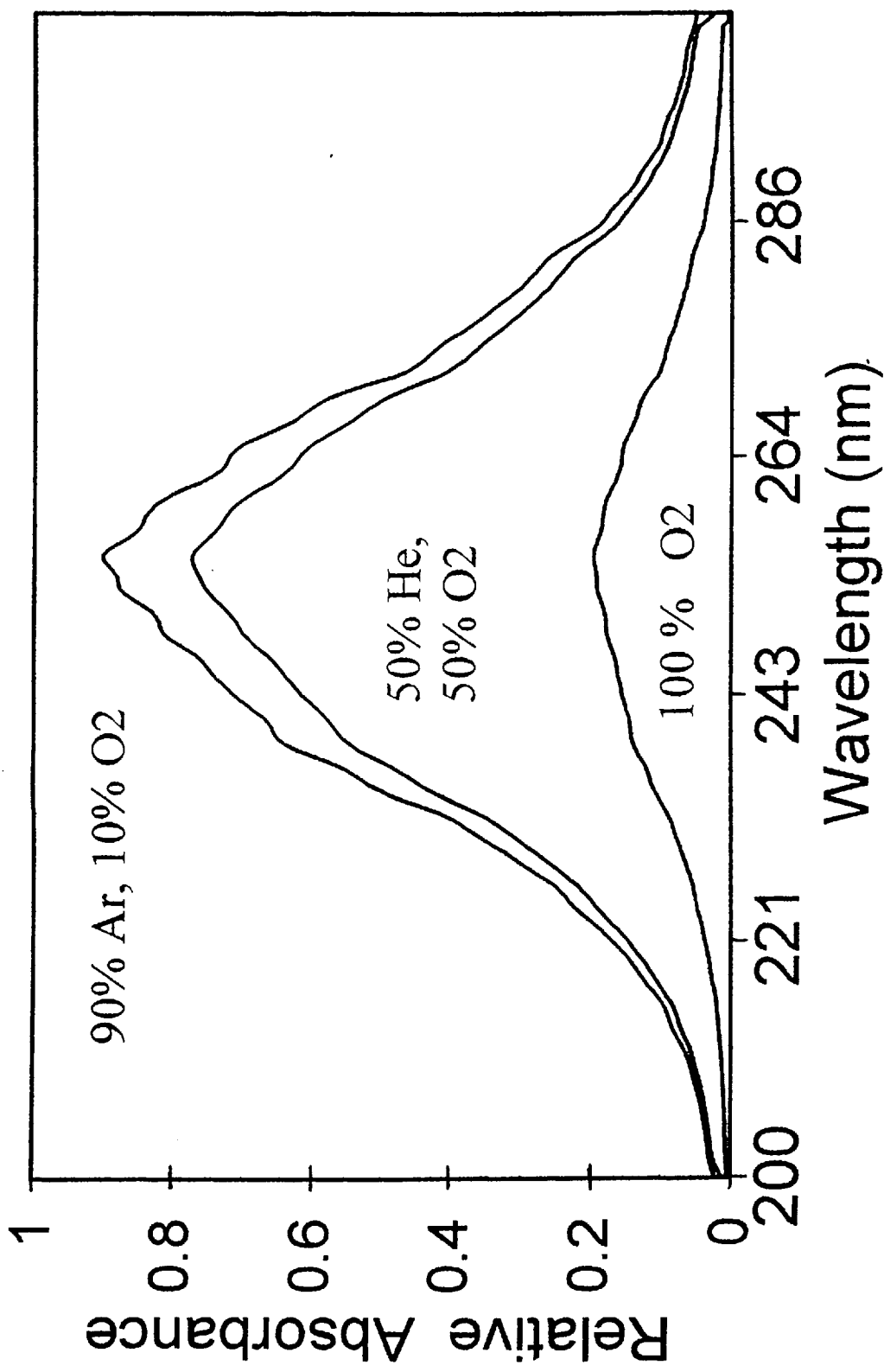
FIG. 7 is a graph showing the absorbance spectra of three gas mixtures: essentially pure oxygen gas; 50% oxygen and 50% helium; and 10% oxygen and 90% argon.

FIG. 7 shows the spectra of three separate samples elected from the samples of FIG. 6. The spectra were obtained from the ultraviolet-visible spectrometer at a total flow of 10 liters per minute with corona discharge as the source of ozone. In each case, the horizontal axis is the wavelength of ultraviolet light measured in nanometers and the vertical axis is the relative absorbance of ultraviolet light by ozone measured by the ultraviolet-visible spectrometer. The relative absorbances of the samples are governed by the Beers law relationship:

$$A = \epsilon\, b\, c \qquad [1]$$

The absorbance of ozone at 254 nanometers, A, is proportional to the species concentration, c, in moles per liter for ozone and cell path length, b, in centimeters. $\epsilon$ is the extinction coefficient for ozone and is 3,000 centimeter-liter/mole. The other gases contained in the gas mixture, e.g. oxygen, nitrogen, helium, argon, neon etc., do not absorb ultraviolet light to any significant degree in the 254 nanometer region.

The lower spectra featured in FIG. 7 is for a gas stream of essentially pure oxygen pumped from the oxygen supply means 11 through the generation means 20 and measured by the ultraviolet-visible spectrometer 40. The essentially pure oxygen stream has a maximum relative absorbance of 0.22 at 254 nanometers. The middle spectra in FIG. 7 is an oxygen (5 liters per minute) and helium (5 liters per minute) mixture pumped through the same apparatus. The 50/50 oxygen/helium mixture has a maximum relative absorbance of 0.78 at 254 nanometers. The upper spectra in FIG. 7 is an oxygen (1 liter per minute) and argon (9 liters per minute) mixture also pumped through the same apparatus. The 10/90 oxygen/argon has a maximum relative absorbance of 0.90 at 254 nanometers.

Oxygen and catalyst gas mixtures of helium, neon and argon were tested, see Table 1, within the method and apparatus of the invention. The catalyst gases krypton and xenon were not tested because of their cost. Radon was not tested because of the health risks involved. The helium/oxygen, neon/oxygen and argon/oxygen mixtures, despite feeding in less oxygen per minute than the pure oxygen discharge, show considerable gains in the quantity of ozone produced. In this particular trial, the argon/oxygen mixture uses one tenth the quantity of oxygen as the pure oxygen trial, but produces approximately three times the ozone.

Figure 8:
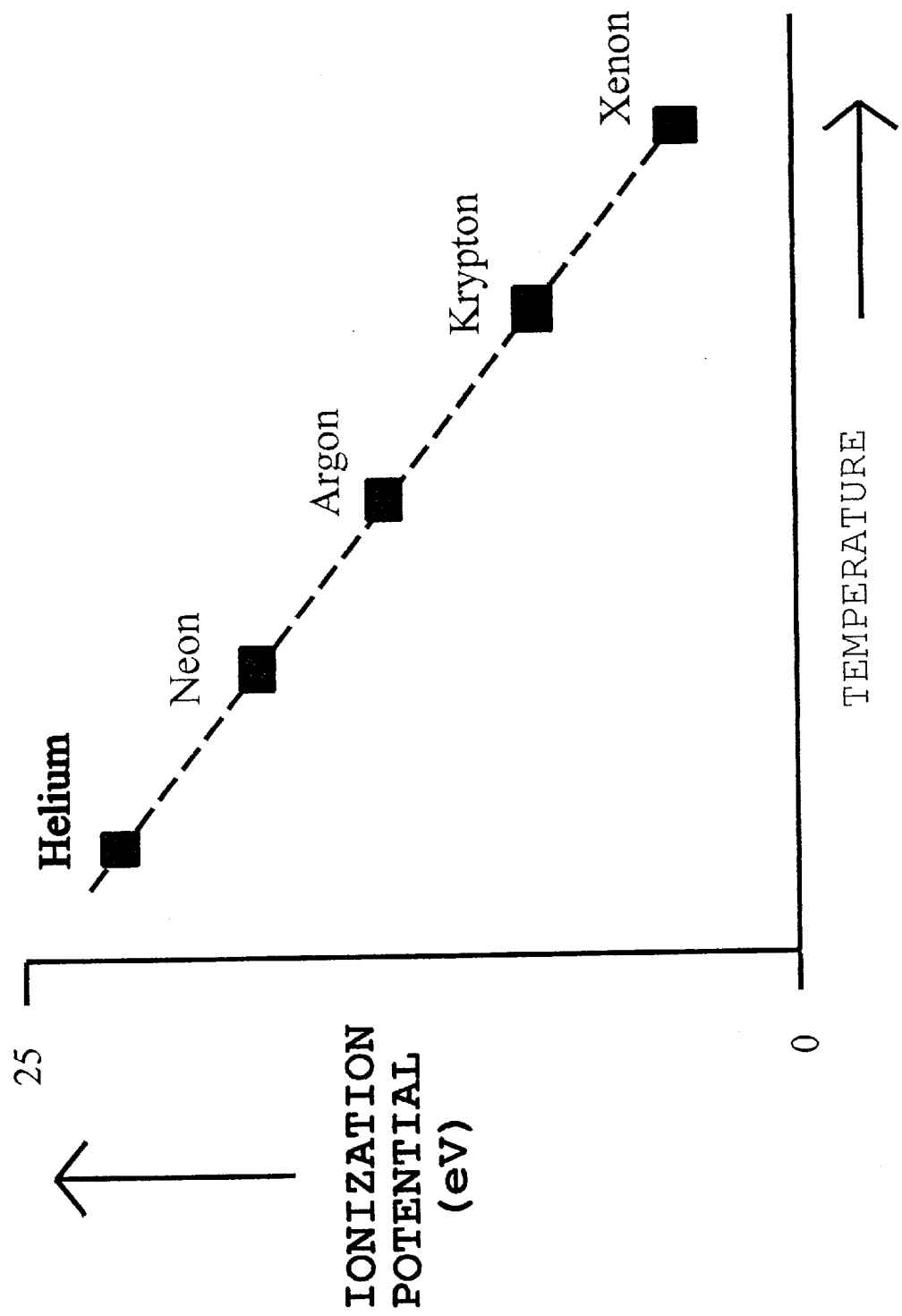
FIG. 8 is a graph illustrating the comparative ionization potentials and relative plasma temperature of various noble gas catalysts.

Although not wishing to be bound by the theory, it is believed that this can be explained in the following manner. The role of the catalyst gases will be outlined first. The noble catalyst gases, helium, neon, argon, krypton, xenon and radon, will not chemically react with oxygen to any appreciable extent. Other gas phase species that might be considered as catalysts, for example nitrogen, carbon monoxide, carbon dioxide, helium, etc., will cause of variety of undesired molecular species to be produced and may result in reactions that produce unfavorable thermodynamic conditions. The role that the noble gases play in the plasma or discharge is two-fold. First, the noble catalyst gas controls the temperature and electron density. Helium, with a high ionization potential, will form a relatively cool plasma with a relatively low electron density. Whereas xenon, with a relatively low ionization potential, will form a relatively hot plasma with a high electron density. "Ionization Potential" refers to the energy required to pull an electron off an atom and form an ion (e.g. $He \rightarrow He^+ + e^-$, IP=24.5 eV). FIG. 8 shows the general relation between temperature, electron density and the ionization potential of the noble catalyst gas. Krypton, xenon and radon are less favorable because of their expense and their boiling points. Second, the noble catalyst gases play a role in elastic and inelastic collisions that are important in the formation of ozone. By selecting a particular noble gas or noble gas mixture, the temperature, and hence energy available for a chemical reaction, can be controlled.

The following thermodynamic considerations should be considered for optimum design in the efficient and economic production of ozone from oxygen. First, the production of ozone from oxygen is an endothermic reaction:

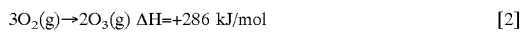

$$3O_2(g) \rightarrow 2O_3(g) \quad \Delta H = +286 \text{ kJ/mol} \qquad [2]$$

The discharge provides the energy needed to convert oxygen to ozone. Second, the decomposition of ozone to oxygen is thermodynamically favored:

$$2O_3(g) \rightarrow 3O_2(g) \quad \Delta G = -326 \text{ kJ/mol} \qquad [3]$$

This decomposition can be slowed by lowering the temperature of the system. The goal of this process is to provide enough energy to convert the oxygen to ozone and to cool the ozone molecules as rapidly as possible before they decompose to an appreciable extent. The inert gases rapidly dissipate energy gained in collisions by emitting electromagnetic radiation. If the discharge energy is to low, equation 2, the formation of ozone from oxygen, will not take place. If the discharge energy is not dissipated rapidly, equation 3, the decomposition of ozone, will be accelerated. The inert gases are an economical chemical medium that will not react with the oxygen or the ozone.

Figure 9:
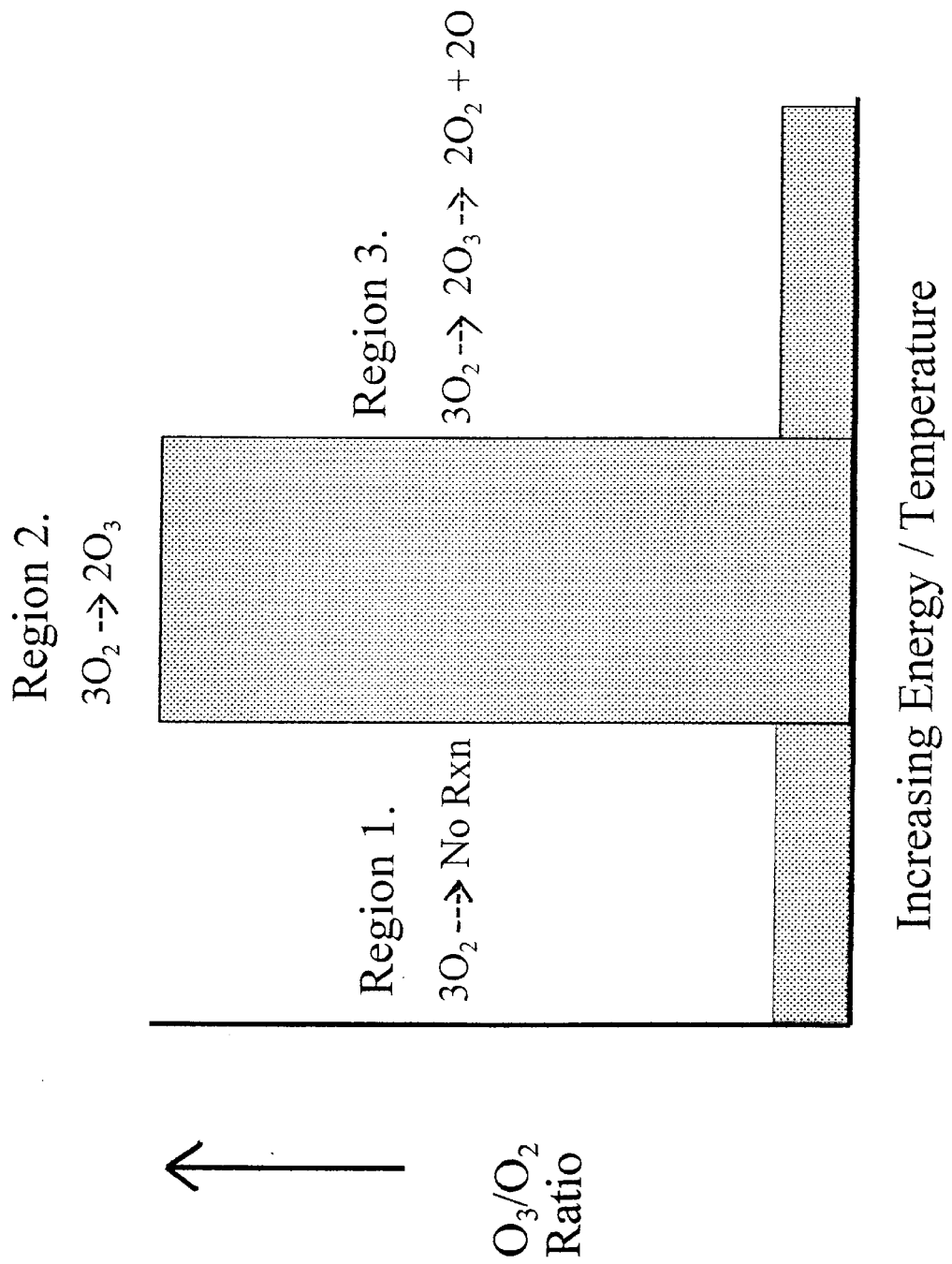
FIG. 9 is bar graph illustrating the predicted ratio of oxygen to ozone conversion efficiency as a function of temperature.

FIG. 9 illustrates the relation between the efficiency of ozone formation and the temperature of the plasma or discharge. In region 1, the low temperature/flow energy region, there is not enough energy to initiate equation 2. In region 2, there is enough energy to cause equation 2 to go but not enough energy remains to allow equation 3 to proceed at any significant rate. This is the desired region to obtain for the efficient production of ozone. In region 3, the high temperature/high energy range, energy is plentiful and equations 2 and 3 both proceed leading to the destruction of the ozone that has been generated. The preferred noble gases do not interact chemically with oxygen or ozone, and are reused in the recirculating loop so they would quality as catalysts. By varying the noble gas and its relative concentration, the temperature and electron density of the plasma can be controlled and the formation of ozone optimized.

The inert gases can be used to test a range of temperatures and electron densities. Helium, with a high ionization potential (IP) will form a relatively cool plasma with a relatively low electron and ion ($He^+$) density. Argon, with a lower ionization potential will form a relatively hot plasma with a higher electron and ion ($Ar^+$) density. Neon falls between argon and helium.

In compositions 20 through 24 below, mixing the inert gases allows a specific temperature and electron density range to be selected and tested for various levels of ozone production. For example, a 50% argon (IP=15.76 eV), 50% He (IP=24.58 eV) mix will produce a discharge gas with an effective ionization potential of 20.17 eV and a temperature and electron density between that of a pure helium and argon plasma. By mixing these gases in different ratios, the average ionization potentials of the plasma may be varied from 15.76 eV to 24.58 eV. This data shows the variation in ozone production as the He/Ar ratio varies and indicates that as there is a lower ionization potential and subsequently a higher temperature, ozone production increases.

For the economical production of ozone, the power consumption is an important facet to be minimized. The discharge uses electrical power to raise the temperature of the gas mixture significantly. The amount of energy ($\Delta H$, calories) needed to raise a certain mass of gas (m, grams) from ambient temperature to discharge temperatures ($\Delta T$, Kelvin) can be estimated from the following relationship:

$$\Delta H = mc\Delta T \qquad [4]$$

The average specific heat, c, of the gas mixture is lowered by the inert gas. This minimizes the energy ($\Delta H$) required to raise the temperature of the gas discharge to the value needed to maintain a discharge that can efficiently produce ozone. Argon's specific heat (0.124 calories/gram/Kelvin) is approximately half that of molecular nitrogen (0.249 calories/grams/Kelvin) and molecular oxygen (0.219 calories/grams/Kelvin), making the argon discharge more efficient than an air discharge or pure oxygen discharge in terms of the electrical power required to raise the gas temperature to discharge conditions. The four different experiments in Table 2 demonstrate the lower power cost, higher quantitative yield, and higher efficiency of the argon/oxygen discharge. Compare composition 6 to the pure oxygen, mixture of composition 1, neon/oxygen mixture of composition 10, and helium/oxygen mixture of composition 12. The power includes both the electrical discharge and cooling unit.

In the inert gas/oxygen discharge, there are minimum endothermic reactions in the discharge to compete for energy with the formation of ozone and ionization of the carrier gas. This is particularly important in comparing the oxygen/inert gas discharge to an air discharge. In the argon discharge, only two endothermic reactions are needed as a precursor for the formation of ozone:

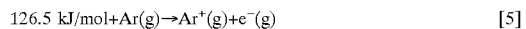

$$126.5 \text{ kJ/mol} + Ar(g) \rightarrow Ar^+(g) + e^-(g) \qquad [5]$$

$$286 \text{ kJ/mol} + 3O_2(g) \rightarrow 2O_3(g) \qquad [6]$$

Having only these reactions, equations 5 and 6, is optimum. The argon ion, $Ar^+$, and electron, $e^-$, couple with the electric field generated across the electrodes and deliver the energy, 286 kJ/mol, needed to convert oxygen to ozone.

In an air discharge, approximately 80 percent nitrogen and 16 percent oxygen, in addition to the formation of ozone per equation 6 and the ionization of nitrogen occurs according to the following equation:

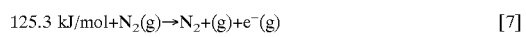

$$125.3 \text{ kJ/mol} + N_2(g) \rightarrow N_2^+(g) + e^-(g) \qquad [7]$$

The reactions outlined below, equations 8–11, will compete for energy with the processes essential to ozone formation. This increases power consumption in ozone production in an electrical discharge.

$$180.5 \text{ kJ/mol} + N_2(g) + O_2(g) \rightarrow 2NO(g) \qquad [8]$$

$$944 \text{ kJ/mol} + N_2(g) \rightarrow 2N(g) \qquad [9]$$

$$66.4 \text{ kJ/mol} + N_2(g) + O_2(g) \rightarrow 2NO_2(g) \quad [10]$$

$$164 \text{ kJ/mol} + 2N_2(g) + O_2(g) \rightarrow 2N_2O(g) \quad [11]$$

The stable products of these reactions, for example nitric oxide and nitrous oxide, have been found in the products of air fed ozone generators. None of the chemical reactions and products of equations 8–11 are needed or are desirable in the production of ozone from oxygen.

The present invention will be further explained by reference to the following examples which are illustrative and should not be construed as limiting the scope of the invention.

EXAMPLE 1

An apparatus and the accompanying method in accordance with the invention was tested. Ozone was generated from gas streams containing oxygen using the apparatus and process as described. The ozone was generated from oxygen gas mixtures of twenty-five different compositions (compositions 1–25) containing oxygen and various other gasses selected from argon, neon, helium and nitrogen gas. These gas mixtures varied from essentially pure oxygen (composition 1) to gas mixtures containing oxygen and up to about 99.5 percent by volume noble catalyst gas (composition 7). Table 1 presents experimental data obtained using the process with the various gas mixtures and reports the flow rate and compositions of the various gas streams, the average ionization potentials for gas mixtures consisting of oxygen and at least two other catalyst gasses (compositions 21–25), the amounts of ozone generated, and the efficiencies. Table 1 demonstrates the effect of the addition of various gasses on the efficiency of ozone production by electrical discharge.

In compositions 1–20, the total gas flow through the electrical discharge chamber was held constant at about 10 liters per minute. In compositions 21–25, the total gas flow through the electrical discharge chamber was held constant at about 11 liters per minute. The compositions and volume ratio of the various catalyst gasses to oxygen was varied in compositions 1–25 as reported in Table 1 below.

TABLE 1

Compositions 1–25 Ozone Production and Efficiencies

| Comp. # | $O_2$ | Ar | Ne | He | $N_2$ | Average I.P. (eV) | Ozone produced (g/hr) | Efficiency ($O_3/O_2$) |
|---|---|---|---|---|---|---|---|---|
| 1 | 10 | — | — | — | — | — | 2.18 | 0.25 |
| 2 | 8 | 2 | — | — | — | — | 3.94 | 0.57 |
| 3 | 6 | 4 | — | — | — | — | 6.21 | 1.21 |
| 4 | 4 | 6 | — | — | — | — | 7.61 | 2.22 |
| 5 | 2 | 8 | — | — | — | — | 7.04 | 4.11 |
| 6 | 1 | 9 | — | — | — | — | 8.06 | 9.42 |
| 7 | 0.05 | 9.95 | — | — | — | — | 0.94 | 22.0 |
| 8 | 9 | — | 1 | — | — | — | 3.31 | 0.43 |
| 9 | 5 | — | 5 | — | — | — | 7.80 | 1.82 |
| 10 | 3 | — | 7 | — | — | — | 7.44 | 2.89 |
| 11 | 9 | — | — | 1 | — | — | 4.22 | 0.55 |
| 12 | 6 | — | — | 4 | — | — | 7.24 | 1.41 |
| 13 | 5 | — | — | 5 | — | — | 6.93 | 1.62 |
| 14 | 2 | — | — | 8 | — | — | 3.52 | 2.05 |
| 15 | 1 | — | — | 9 | — | — | 0.12 | 0.14 |
| 16 | 9 | — | — | — | 1 | — | 2.59 | 0.33 |
| 17 | 7 | — | — | — | 3 | — | 2.25 | 0.37 |
| 18 | 5 | — | — | — | 5 | — | 2.31 | 0.54 |
| 19 | 3 | — | — | — | 7 | — | 2.30 | 0.89 |
| 20 | 1 | — | — | — | 9 | — | 1.74 | 2.04 |
| 21 | 1 | 1 | — | 9 | — | 23.7 | 3.45 | 4.03 |
| 22 | 1 | 3 | — | 7 | — | 21.9 | 4.44 | 5.18 |
| 23 | 1 | 5 | — | 5 | — | 20.2 | 5.68 | 6.63 |
| 24 | 1 | 7 | — | 3 | — | 18.4 | 6.79 | 7.92 |
| 25 | 1 | 9 | — | 1 | — | 16.6 | 8.11 | 9.46 |

The addition of a catalyst gas to the oxygen stream used in generating the ozone causes gains in the efficiency of ozone production. The efficiencies were measured in weight percentages and were calculated be dividing the mass of ozone produced by the process by the mass of the oxygen entering the discharge chamber.

The addition of a noble gas, even in amounts as low as 10 volume percent, causes increases of at least 72 percent in the efficiency of ozone production. The additions of larger proportions of noble catalyst cause greater increases in the efficiency of ozone production. Nitrogen gas, $N_2$, increases the efficiency of the ozone formation to a smaller degree than does the addition of argon, neon or helium. In addition to not increasing the efficiency as greatly, the addition of nitrogen gas generates various undesirable oxides of nitrogen, generalized by the formula $N_xO_y$ where x and y are greater than zero.

The highest efficiency of oxygen to ozone conversion was observed with the gas mixture of composition 7 using an oxygen and argon mixture of about 0.5 volume percent oxygen and about 99.5 volume percent argon. However, this low oxygen gas mixture produces a relatively small quantity of ozone gas. The largest quantity of ozone, as measured in grams of ozone per hour, was generated from the gas mixture of composition 25. The gas mixture of composition 25 consisted essentially of about 9 volume percent oxygen, 82 volume percent argon and 9 volume percent helium. Similarly high results in quantity of ozone and efficiency of ozone production were observed for the binary gas mixture of composition 6 which consisted of about 10 volume percent oxygen and 90 volume percent argon. The addition of argon as a catalyst gas in the method of the invention is preferred because of the high efficiencies and quantities of ozone resulting form the use of argon as a catalyst. Additionally, argon gas comprising approximately 0.9 percent of atmospheric gasses is the most economical of the noble gases.

The gas mixtures of compositions 1, 6, 10 and 12 were measured for power consumption during ozone production by electrical discharge in the method and apparatus as detailed. The measured power consumption of the respective compositions was divided by the quantity of ozone generated to determine the power cost per kilogram of ozone for compositions 1, 6, 10 and 12. The results of the measurements of power consumption during ozone generation and the power costs for compositions 1, 6, 10 and 12 are presented in Table 2 below.

TABLE 2

Comparison of efficiencies, ozone production and power costs for the gas mixtures of compositions 1, 6, 10 and 12.

| Parameters | Comp. #1 Pure $O_2$ | Comp. #6 Ar/$O_2$ | Comp. #10 Ne/$O_2$ | Comp. #12 He/$O_2$ |
|---|---|---|---|---|
| $O_2$ (liter/min) | 10 | 1 | 3 | 6 |
| Argon (liter/min) | — | 9 | — | — |
| Neon (liter/min) | — | — | 7 | — |
| Helium (liter/min) | — | — | — | 4 |
| Power (Watts) | 49 | 44 | 46 | 51 |
| $O_3$ grams per hour | 2.20 | 8.11 | 7.44 | 7.31 |
| Efficiency (%) | 0.25 | 9.5 | 2.89 | 1.48 |
| Power Cost (kW-hr/kg) | 22.3 | 5.43 | 6.20 | 6.98 |

In the above four compositions, the power cost for producing ozone using a noble gas catalyst averaged 6.2 kilowatt-hours per kilogram of ozone generated, whereas the power cost for producing ozone from oxygen without the addition of a catalyst gas was 22.3 kilowatt-hours per kilogram of ozone. On average, the power cost for generating ozone was reduced by over 70 percent by adding a noble gas to the oxygen stream used to generate ozone gas by electrical discharge. Of the compositions observed for power consumption and cost, composition 6 using argon as the catalyst had the lowest energy consumption and cost per kilogram of ozone generated. Again, the addition of argon as a catalyst gas in the method of the invention is preferred because of the high efficiencies and low costs of using argon as the catalyst.

Figure 10:
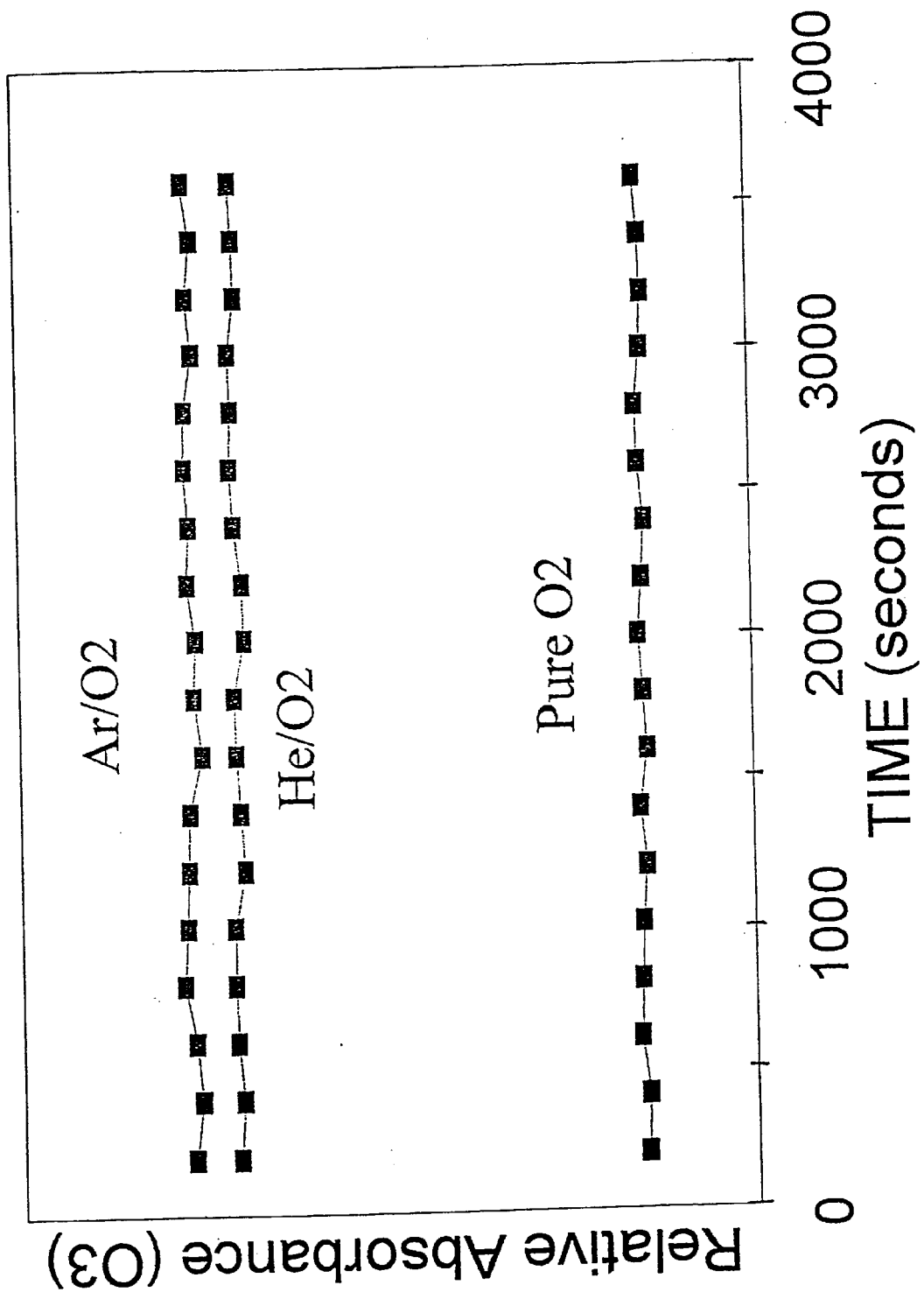
FIG. 10 is a graph demonstrating the constant rate of ozone generation for three different gas mixtures.
Figure 11:
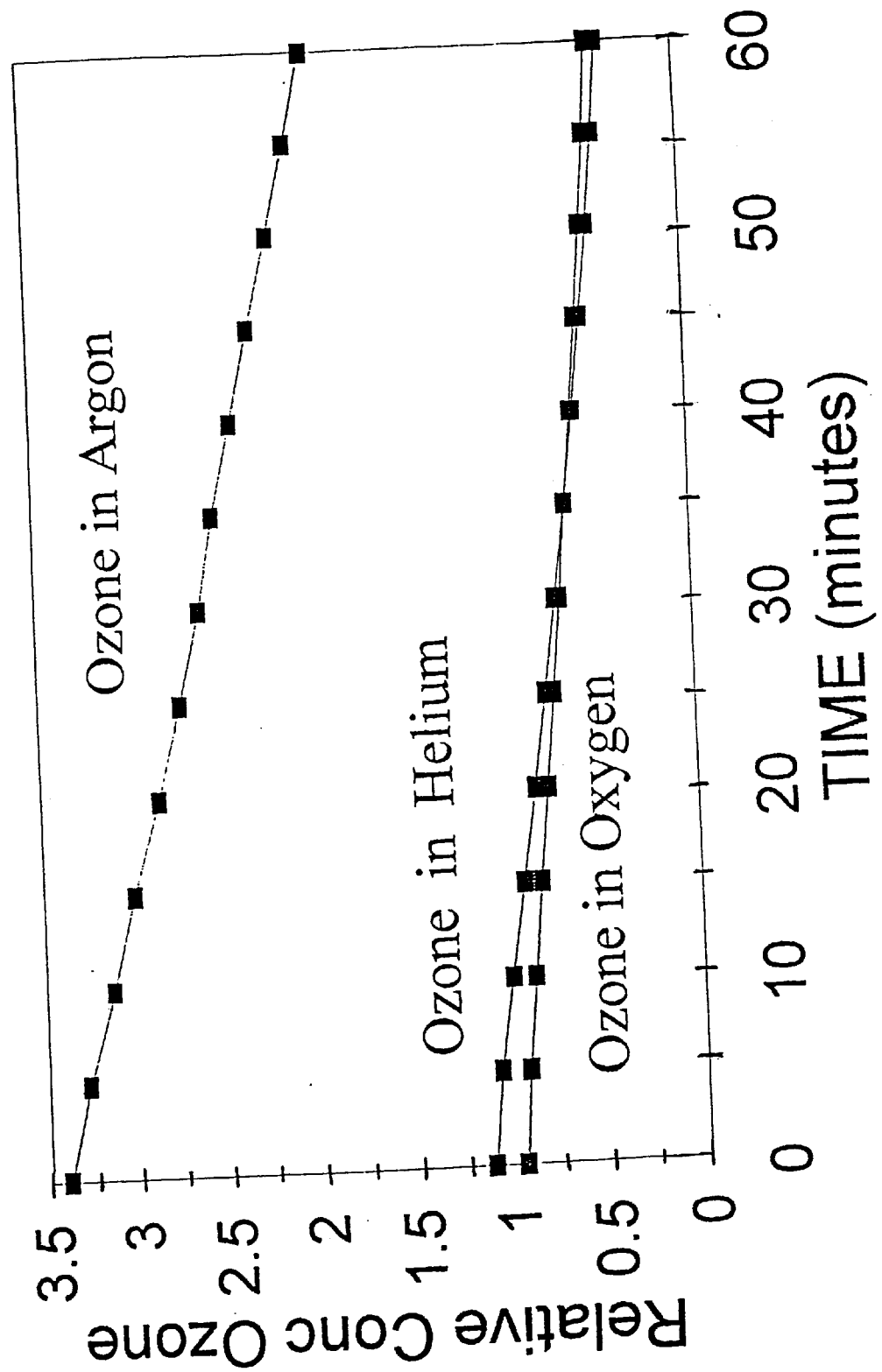
FIG. 11 is graph comparing the decomposition rates of ozone in three gas mixtures: 90% argon and 10% oxygen; 40% helium and 60% oxygen; and essentially pure oxygen.

Compositions 1, 6 and 13 were observed to confirm that the ozone output remained constant with time. After exiting the electrical discharge chamber, the gas streams of compositions 1, 6 and 13 were monitored by an ultraviolet spectrometer to quantify the level of ozone produced. Measurements were taken at regular 3 minute and 20 second intervals for over 60 minutes. The observed relative absorbances for the three compositions and were plotted versus the time of measurements to produce FIG. 10. The lowermost line presents the data observed for the ozone generated from the gas stream consisting essentially of oxygen, i.e., composition 1. The uppermost line presents the data observed for the ozone generated from the gas stream consisting of a 1 to 9 mixture of oxygen to argon, i.e., composition 6. And the middle line presents the data observed for the ozone generated from the gas stream consisting of a 1 to 1 mixture of oxygen to helium, composition 13. The relative absorbances of the gas streams showed little variation over the time period they were monitored and hence the quantity of ozone generated remained relatively constant.

Ozone decomposes into oxygen gas at ambient conditions. Compositions 1, 6 and 12 were observed to determine if the rate of ozone decomposition in noble gas mixtures varied substantially from the rate of ozone decomposition in non-noble gas containing mixtures, composition 1, at ambient temperature. For each of the three above compositions, the ozone generation process was halted and a sample of the generated ozone and the accompany gas mixture was sealed in the quartz cell of the ultraviolet spectrometer. The concentration of ozone in the sealed quartz cell was then measured at regular five minute intervals for 60 minutes and plotted to generate decomposition curves for the three compositions. The measurements and accompanying decomposition curves are presented in FIG. 12.

The rates constants, k, for the decomposition of ozone of the gas mixtures of the compositions was determined to be first order, $r=k[O_3]^1$. The rate of decomposition of the ozone in essentially pure oxygen, composition 1, is $-0.00445$ ($\pm 0.002$) min$^{-1}$. The rate of decomposition of the ozone in the 1 to 9 oxygen to argon mixture, composition 6, is $-0.00766$ ($\pm 0.002$) min$^{-1}$ and the rate of decomposition of the ozone in the 6 to 4 oxygen to helium mixture, composition 12, is $-0.00556$ ($\pm 0.002$) min$^{-1}$. The rates of decomposition appear to be comparable and the data illustrates that the rate decomposition of ozone in oxygen, argon and helium containing mediums occur at similar rates at ambient temperature.

The data and results presented should be construed as typical. Experimental details such as: gas flow rates, gas pressure, gas purity, gas inlet temperature, electrical voltage and frequency, electrode geometry, the average dielectric constant of the chemicals between the electrodes, and the electrode coverings are examples of parameters that can be varied easily and effect results such as efficiency, grams per hour, and power required.

As many apparently different embodiments of this invention can be made without departing from the scope of this invention is not limited to the specific embodiments described but only as defined in the appended claims.

What is claimed is:

1. A method of generating ozone comprising the steps of:

(a) supplying a gas mixture comprising a volume of oxygen and a volume of catalyst gas wherein the volume of oxygen to the volume of catalyst gas is less than 9 to 1, and (b) generating ozone from the gas mixture.

2. The method of claim 1, wherein the gas mixture is supplied at an oxygen to catalyst gas volume ratio of not greater than 8.3 to 1.

3. The method of claim 1, wherein the catalyst gas consists essentially of a noble gas or a mixture of noble gasses.

4. The method of claim 1, wherein the catalyst gas comprises helium, neon, argon, krypton, xenon, or radon.

5. The method of claim 4, wherein the catalyst gas comprises helium, neon or argon.

6. The method of claim 5, wherein the catalyst gas comprises argon.

7. The method of claim 1, wherein the ozone is generated using an electrical discharge.

8. The method of claim 1, wherein the gas mixture is supplied at an oxygen to catalyst gas volume ratio of not greater than about 4 to 1.

9. The method of claim 1, further comprising steps of (c) reacting or removing the ozone generated in step (b); and (d) recirculating the gas remaining in the gas mixture after step (c) to step (b) or to step (a).

10. The method of claim 9, wherein oxygen is added to the gas mixture after step (c) in order to maintain a specific oxygen to catalyst ratio in the gas mixture.

11. The method of claim 9, further comprising removing contaminants from the gas mixture after step (c) and before recirculating the gas remaining in the gas mixture to step (b) or step (a).

12. The method of claim 1, wherein the catalyst gas consists essentially of helium, neon, argon, krypton, xenon, radon or a mixture thereof and the volume of the catalyst gas comprises greater than 10 volume percent of the gas mixture.

13. The method of claim 12, wherein the catalyst gas comprises greater than 12 volume percent of the gas mixture.

14. The method of claim 13, wherein the catalyst gas comprises not less than 20 volume percent of the gas mixture.

15. The method of claim 1, wherein the gas mixture comprises greater than 20 volume percent of catalyst gas and the catalyst gas consists essentially of helium, neon, argon, krypton, xenon, radon or a mixture thereof.

16. The method of claim 1, wherein the method has an efficiency of oxygen to ozone conversion of greater than about 0.55 percent.

17. A method of producing ozone comprising the steps of:
  a) supplying a gas mixture comprising oxygen and a noble gas at an oxygen to noble gas volume ratio less than 8 to 1,
  b) generating ozone from the oxygen and noble gas mixture using an electrical discharge method,
  c) reacting a portion of the ozone with a chemically reactive species or removing a portion of the ozone from the gas mixture,
  d) adding sufficient oxygen to the oxygen and noble gas mixture after step (c) to maintain the oxygen to noble gas ratio at less than 8 to 1, and
  e) recirculating the oxygen and noble gas mixture remaining after steps c) and d).

18. A method of generating ozone comprising generating ozone with an electrical discharge method from a gas mixture comprising oxygen and a catalyst gas comprising helium, neon, argon, krypton, xenon or radon, wherein the volume of the catalyst gas is greater than 12 volume percent of the gas mixture.

19. The method of claim 18, wherein the volume of the catalyst gas is greater than or equal to 20 volume percent of the gas mixture.

* * * * *